United States Patent [19]
Fox

[11] Patent Number: 5,693,224
[45] Date of Patent: Dec. 2, 1997

[54] APPARATUS FOR ELIMINATING HYDROGEN SULFIDE FROM LIQUIDS

[75] Inventor: Richard B. Fox, Chesterfield, Mo.

[73] Assignee: Gas Sweetener Associates, Inc., Chesterfield, Mich.

[21] Appl. No.: 695,722

[22] Filed: Aug. 12, 1996

[51] Int. Cl.[6] ................................................. C02F 1/58
[52] U.S. Cl. .................. 210/202; 210/203; 210/205; 210/220; 210/283; 210/291; 422/217; 95/181; 95/219
[58] Field of Search .................... 210/202, 203, 210/205, 220, 283, 323.1; 422/217; 95/181, 219

[56] References Cited

U.S. PATENT DOCUMENTS

| 3,554,377 | 1/1971 | Miller | 210/283 |
|---|---|---|---|
| 3,623,978 | 11/1971 | Boze | 210/283 |
| 4,208,281 | 6/1980 | Haberer et al. | 210/36 |
| 4,454,040 | 6/1984 | Roberts | 210/283 |
| 4,476,027 | 10/1984 | Fox . | |
| 4,478,800 | 10/1984 | van der Wal et al. | 423/230 |
| 5,211,851 | 5/1993 | Meurer | 210/283 |

Primary Examiner—Peter A. Hruskoci
Assistant Examiner—Betsey J. Morrison
Attorney, Agent, or Firm—Haverstock, Garrett & Roberts

[57] ABSTRACT

Sweetening of hydrogen-sulfide polluted liquids such as water and those whose viscosity is not substantially greater, is accomplished in upright tanks of constant cross-section, which are substantially conventional except for man-way provisions which permit clean-out and replacement of contents. Each tank, which has a liquid inlet provision near its bottom, is divided by its contents into three sections: a lowermost turbulence-eliminating section, an intermediate reacting section, and an uppermost tranquil purified storage section. Increase in capacity to fill a constant demand is attained by simply increasing the depth of the reacting section, to the lessening of the purified reserve.

6 Claims, 2 Drawing Sheets

APPARATUS FOR ELIMINATING HYDROGEN SULFIDE FROM LIQUIDS

BACKGROUND OF THE INVENTION

1. Field of the Invention

The present invention relates to apparatus for sweetening hydrogen-sulfide-polluted water and similarly polluted liquids of substantially similar or lesser viscosity, such as light hydrocarbons.

2. Prior Art

Water from underground sources, available in many regions where unpolluted water is scarce, may be the only water available for domestic and commercial uses. Its "rotten egg" taste and smell make it offensive. Similarly, lightweight hydrocarbons, for example gasoline and liquefied natural gas, may be so polluted by hydrogen sulfide as to be corrosive or otherwise less valuable for desired usages.

The principal purpose of the present invention is to provide simple apparatus, preferably using relatively standard upright tanks, for purification of such non-viscous liquids, the apparatus ranging in size and arrangement from that for domestic use to much larger sizes for near-constant high demand use, as for industrial purification of hydrocarbon liquids.

SUMMARY OF THE INVENTION

Liquids to be purified are generally made available by pumping through relatively small diameter pipes, arriving at corrective apparatus in highly turbulent flow.

In the present invention, I employ a simple vertical tank, of substantially constant cross-section between its top and bottom. The tank is effectively divided into three sections: a lowermost turbulence-eliminating section, an intermediate reaction section, and an uppermost substantially tranquil purified-reserve section. Higher constant output may be obtained by enlarging the reaction section, with corresponding lessening the volume of the purified reserve section.

Two embodiments are here described: one embodiment for standardized tank sizes, in which these sections are divided at fixed positions by lower and upper racks or trays as hereafter described; and the second embodiment for non-standard tanks with no such racks, in which a fill of solid particles (such as clean small rocks or gravel) in the lowermost section, supports the fill in the intermediate section of inert particles which carry the reactive oxide; and these inert particles support a filter thereabove.

With either embodiment, constant high-demand use may be attained by increasing the depth of the section utilized for the reactant material, with corresponding lessening of the reservoir of already-purified liquid.

DESCRIPTION OF THE PREFERRED EMBODIMENT

Figure 1:
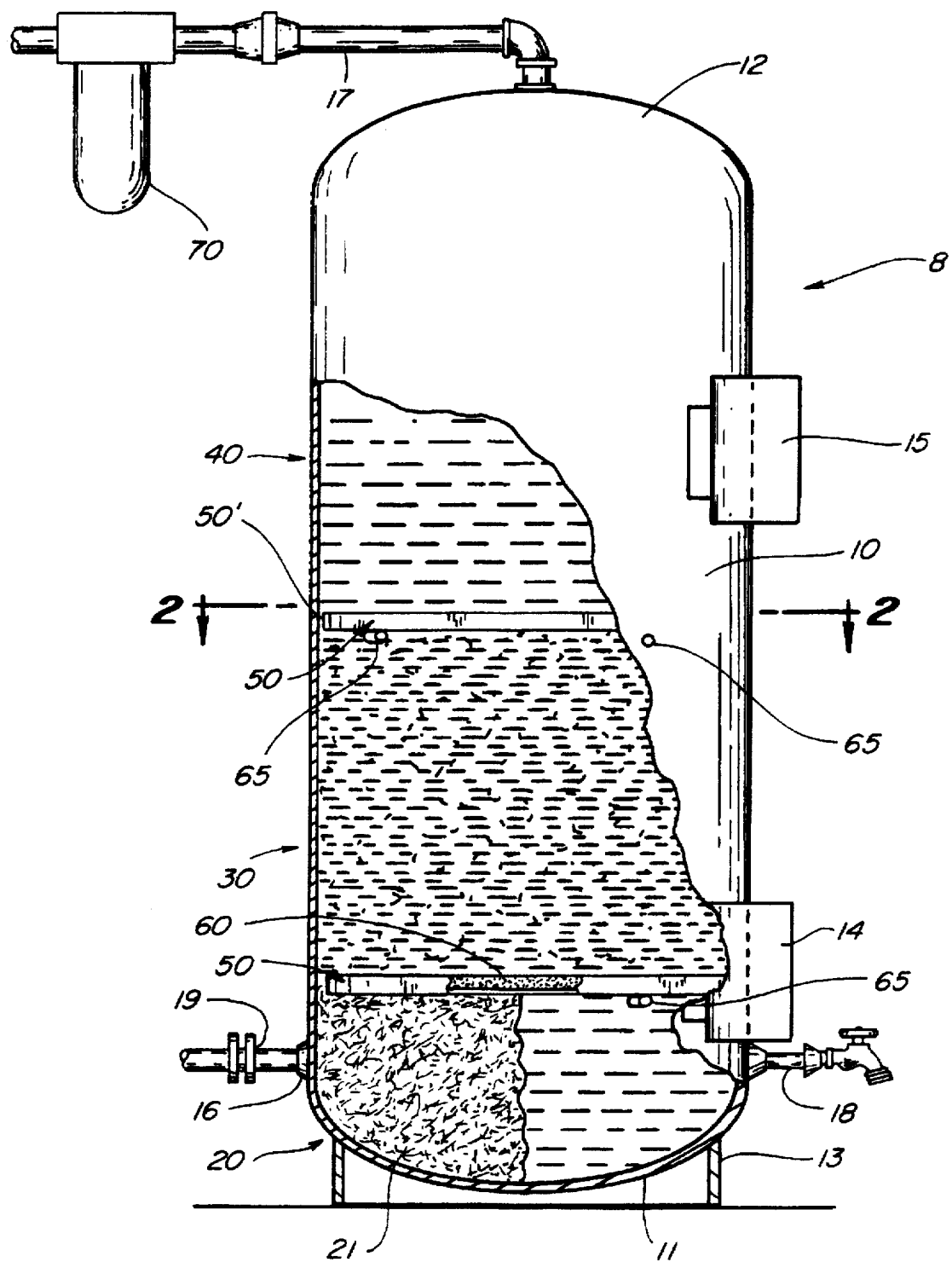
FIG. 1 is a broken-away cross-sectional view of a vertical tank of circular cross-section and having two man-ways at convenient heights, this embodiment being fit for standardized manufacture, and including trays at two levels. Optionally (as shown at the left side of FIG. 1), its lower section may be filled with clean gravel or strong non-soluble particulate material which slows and diffuses the turbulent inflow and supports a filter pad and the fill of materials thereabove.

Use of such a suitable rack assembly, as shown in FIG. 1, is preferred; however if the tank base has a fill of small rocks preferably at least gravel size, they, without such a tray, will support a foam pad upon which the inert particles which bear a reactive oxide may be poured to extend up to the level marked 2—2 in FIG. 1.

FIG. 1 shows a tank or reaction vessel of a type suitable for standardized production for a typical occasional-demand use, such as in residences served by a community water supply tainted with hydrogen sulfide. The vessel, generally designated 8, has a cylindrical side wall 10 equipped with a sealed removable lower man-way or access panel 14 and a similar upper access panel 15. Conventionally, it may have a rounded bottom wall 11 and top wall 12, and may be supported on a short cylindrical base support ring 13.

Substantially at the juncture of the lower cylindrical side wall 10 with the rounded bottom wall 11, a bottom flow inlet 16 is provided; while at the rounded top wall 12 is a top outlet pipe 17 with a bend from vertically upward to sideward. Substantially opposite to the bottom inlet 16 is a faucet-like drain 18.

In advance of the bottom inlet 16 is a conventional flow-limiting orifice or valve 19, having a shut-off provision carefully set to limit inflow to avoid an excessive upflow rate, as hereinafter explained.

From a functional standpoint, the apparatus has three portions or sections: a lowermost turbulence-removing section generally designated 20, a reacting section 30 thereabove, and a tranquil treated-liquid storage section 40 thereabove. The reacting section generally designated 30 must be sufficiently deep to provide contact time for reaction of hydrogen sulfide during upflow at the maximum rate permitted by an inflow valve or orifice 19, as hereafter mentioned. The tranquil section generally designated 40 may be of fairly similar depth; it has no solid fill and serves as the available supply of purified liquid. For installations of chosen size and for a selected purpose, e.g., water purification, optional proportions and dimensions may be determined and standardized.

The turbulence-removing section 20 must extend sufficiently above the flow inlet 16 to afford the necessary spreading of the turbulent fast-inflowing liquid over the entire cross-sectional area of the tank, thereby to provide fairly even upflow to the reacting section 30 thereabove. It is apparent that inflowing water or other liquid, entering through the bottom inlet 16 and the flow-limiting orifice or valve 19, will be turbulent, partly due to the relatively small cross-section of the bottom inlet itself and of the flow-limiting orifice or valve 19. The huge increase in cross-sectional area for upflow (even with the alternative rock fill 21 as illustrated at the left half of FIG. 1) results in a non-turbulent slow upflow within only a few inches of rise above the inlet 16. If no rock fill 21 is utilized, a support rack as in FIG. 2 will be necessary. In either case, a filter 60, preferably of open-cell or reticulated foam plastic, will divide the lower reaction 20 from the intermediate section 30.

Figure 2:
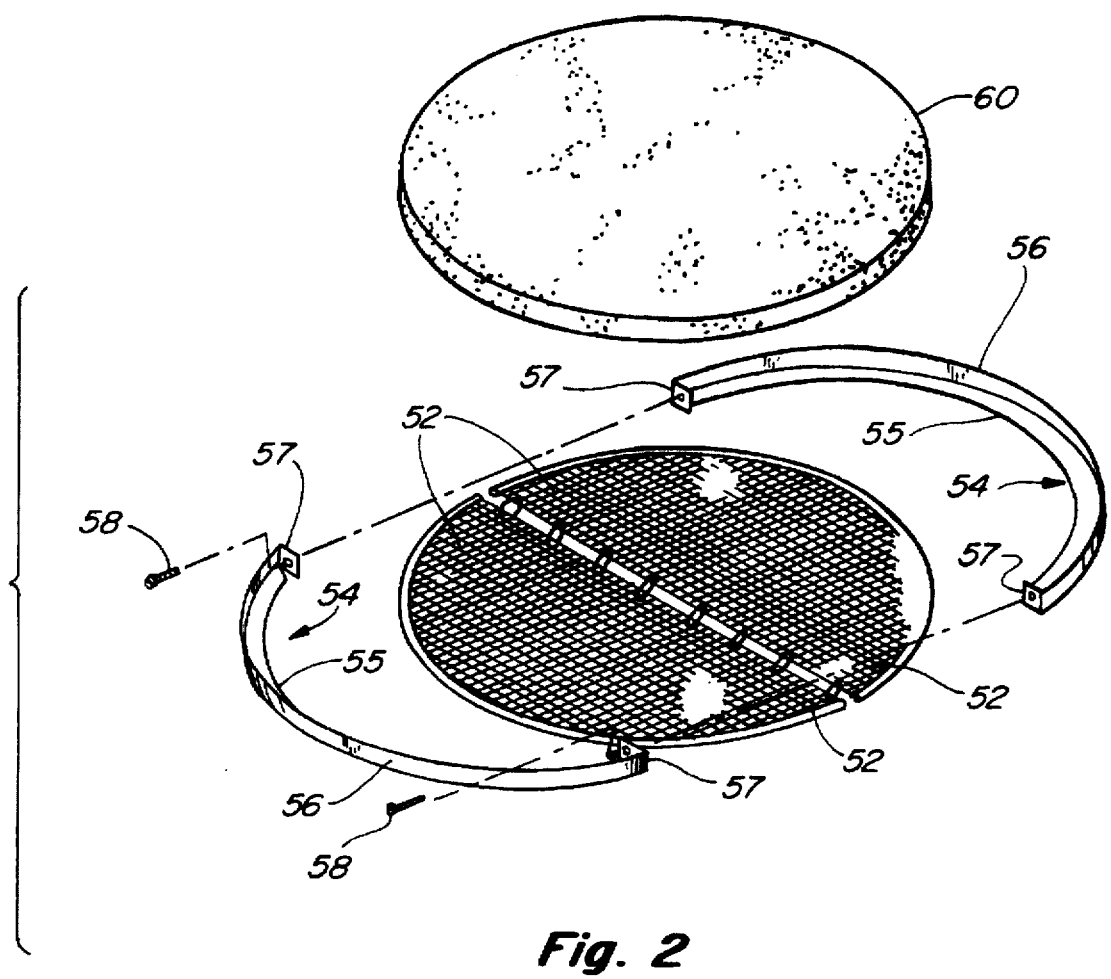
FIG. 2 is an exploded view of an insertable rack assembly adapted to hold a foam filter pad.

Embodiments Using Support Racks:

Use of a support rack (as shown in FIG. 2) for the filter 60, positioning it at a level above the flow inlet 16, permits the entire lowermost portion of the tank to be utilized for changing the rapid, turbulent liquid inflow to very slowly rising non-turbulent upflow in the reacting section thereabove.

When such support racks, generally designated 50, are available for use, they must be capable of being inserted in place through a man-way 14, 15 whose greatest opening must be more than half the inner diameter of the tank. A simple rack means 50, to be inserted and assembled within the tank so as to span its entire cross-section, is shown in detail in FIG. 2. Such rack 50 comprises two semi-circular bottom screens 52 hinged together and two semi-circular rim sections generally designated 54. Each semi-circular rim section has a narrow curved horizontal base strip 55 and an upward-extending outer rim 56, which rim has at each of its ends a vertical flange 57 which may be bored to receive a loose-fitting cross-pin 58. The flanges 57 may be either bent inward from the ends of the outer rim 56 or upward from the horizontal base strips 55, and may be drilled at their midpoints to accept joining pins 58.

When assembled within the tank and a hinged pair of semi-circular screens 52 opened and placed thereon, the rack 50 may rest on two studs or bolts 65 which project inward from the tank inner wall at 90° intervals.

Into each lower support rack 50 is placed a circular full-diameter filter, which may be a simple open-cell plastic foam pad 60 whose thickness is at least one inch, preferably about two inches; in it is poured a fill (whose depth may vary for example from one-fourth to one-half of the tank depth) of an $H_2S$ reactant oxide intermixed with and retained on inert carrier material. Such material, pre-mixed, is obtainable from Gas Sweetener Associates, Inc., St. Louis, Mo., under the trademark "SULFACLEAN". This pre-mixed material has a composition substantially like that shown in U.S. Pat. No. 5,320,992, except for the omission of sodium sulfite. The approximate percentages of its ingredients are:

| Ingredient | % |
| --- | --- |
| Calcined Montmorillonite | 60 |
| Reactive iron oxide composed of a crystalline phase of $Fe_3O_4$ together with an amorphous $Fe_2O_3$ moiety | 22 |
| Water (retained after draining the montmorillonite before wetting and intermixing the oxide) | 18 |
| | 100 |

Above such fill of reactant material is a second similar open-cell plastic foam pad 60 which (at the option of the user) may be either:

a) in a second rack 50', supported like the first mentioned rack 50 by studs or bolts 65 projecting inward into the wall spacedly above the reactive fill as shown; or b) in a second rack 50' resting on the reactive fill; or c) without a rack, when the pad 60 is placed on the reactive fill and held down by a scattering of clean rock.

It has been found that, with the liquid upflow rate limited as herein disclosed, substantially all the oxide particles will remain adhered to the pre-moistened surfaces of the inert mineral carrier. A transparent plastic model was used to observe and measure what rate of upflow served to avoid carrying of the reactive oxide particles away from their pre-wetted support inert mineral particles. It was found that when the upflow rate into this tranquil region was two inches per minute or less, there would be no observable carry-upward of oxide particles from the reacting section into the tranquil section. Nevertheless, the use of a foam pad 60, supported in any of the manners above listed, will avoid carry-up of oxide particles.

While it is so obvious that this limit on upflow rate should be "designed into" the system, one may readily adjust the flow-limiting valve or orifice 19 to assure that no oxide is carried up into the sight glass 70.

Embodiments Without Support Racks:

The invention is also capable of use in vertical tanks for which no such racks or trays are available, but which has adequate man-way provisions for access at approximately the levels shown.

Where a tank has such man-way provisions, the entire bottom section must be filled (as seen at the left side of FIG. 1) to a level above the inlet 16, with such flow-pervious fill of small clean rocks or other particulate inert material; such fill both provides the flow distribution function and supports the reaction section thereabove. Onto a filter thereon is piled a fill of the reactant material, preferably to about the depth shown in FIG. 1; upon it is laid a second foam pad 60, to be held in place by a scattering of inert rock particles thereon. This construction adds flexibility to the installation, in that the height of the fill of reactant material may be varied from that shown in the drawings to nearer the top of the tank. This may afford a greater constant output of sweetened liquid, as in an industrial installation; whereas for occasional high demand use (as for household installations), an adequate reservoir of sweetened liquid may be provided using the approximate divisions of tank space as here shown.

Filters such as the plastic foam pads 60 have been found sufficient to retain those oxide particles which may escape from their inert mineral particles if the upflow rate is increased unduly. For monitoring, a conventional sight glass 70 may be inserted in the outlet pipe 19.

For clean-out of and changing of the reactive material:

When the reactivity of the oxide is substantially used up (which may be many months), the inlet valve 19 is shut-off and the liquid content of the tank is drained through the drain 18, the upper filter 60 is removed through the upper man-way 15, and the upper tray 50' (if used) is dismantled and removed. The fill of reactive material on its inert carrier is removed through either the lower man-way 14 or both man-ways, and the lower filter 60, as well as the lower tray 50 (if used) are removed through the lower man-way 14. It will not ordinarily be necessary to change out the rock or gravel (or other flow-diffusing contents) in the lower tank section 20. Then new filters 60 are supplied and a new fill is made of the inert particles bearing the $H_2S$ reactive oxide.

Uses For Sweetening Liquids Other Than Water:

For such purpose as sweetening light hydrocarbon liquids, the following is noted: the viscosity of water at 50° F. is about 1.3 centipoises. Hence:

a) all hydrocarbon liquids whose viscosity is less than that of water, such as ethanol, propane and butane, liquid natural gas and gasoline, may be sweetened at room temperature by the disclosed apparatus; and b) those hydrocarbon liquids whose viscosity is slightly greater, such as kerosene, may be similarly sweetened by first heating to a safe temperature (for kerosene, 100° F.) which lowers its viscosity to approximately that of water at 50° F.

Variations in detail from this specification will be apparent to those persons skilled in the art. It is therefore intended that all matter contained in the foregoing description or shown in the accompanying drawings shall be taken as illustrative rather than limiting.

I claim:

1. Apparatus for removing hydrogen sulfide from water or other liquids whose viscosity is substantially equal to or less than water, comprising a vertical tank of substantially constant cross-section having a lower inlet and a top outlet, said tank including (a) a lowermost tank section having associated therewith a liquid inlet including flow-limiting or orifice means, said tank section extending upwardly above such liquid inlet sufficiently to slow the upflow to non-turbulent, (b) a reacting section above said lowermost tank section for containing reactions removing hydrogen sulfide, (c) filtering means interposed between said lowermost tank section and said reacting section, and (d) a fill of an inert carrier on which are lodged particles of a hydrogen-sulfide-reacting oxide in said reacting section above said filtering means, whereby in the lowermost section turbulence is removed, and in the reacting section thereabove, hydrogen sulfide is removed, whereby the slowed, non-turbulent upflow from the said lowermost tank section provides reaction time for eliminating hydrogen sulfide from the liquid.

2. Apparatus as defined in claim 1, together with a tranquil liquid upper section above said reacting section, said tranquil section having its volume substantially occupied only by the liquid from which hydrogen sulfide has been so reacted, whereby the lack of fill in said tranquil upper section provides such increase in effective cross-sectional flow area and such corresponding decrease in upflow rate as to assure freedom from carry-up of any particulate oxide which may be dislodged from its inert carrier.

3. Apparatus as defined in claim 1, wherein said lowermost tank section contains, extending upward to a level above said liquid inlet, means to diffuse the inflow over the cross-sectional area of the tank.

4. Apparatus as defined in claim 1, wherein said filtering means retains such oxide particles as may become loosened from the inert particles upon which they are supplied.

5. Apparatus as defined in claim 4, wherein said filtering means is an open-cell plastic foam pad.

6. Apparatus as defined in claim 4, wherein a filtering means separates said reacting section from said tranquil liquid upper section, whereby effectively to screen out any oxide particles which may rise as liquid rises upward to such upper section.

\* \* \* \* \*